US012440046B2

(12) United States Patent
Bruegmann

(10) Patent No.: US 12,440,046 B2
(45) Date of Patent: Oct. 14, 2025

(54) MERCHANDISE DISPLAY ROLLER TRACK HAVING HIGH STRUCTURAL RIGIDITY

(71) Applicant: Bruegmann USA, Inc., Houston, TX (US)

(72) Inventor: Lars Bruegmann, Dortmund (DE)

(73) Assignee: Bruegmann USA, Inc., Houston, TX (US)

( * ) Notice: Subject to any disclaimer, the term of this patent is extended or adjusted under 35 U.S.C. 154(b) by 52 days.

(21) Appl. No.: 18/502,691

(22) Filed: Nov. 6, 2023

(65) Prior Publication Data

US 2024/0172880 A1 May 30, 2024

Related U.S. Application Data

(60) Provisional application No. 63/428,514, filed on Nov. 29, 2022.

(51) Int. Cl.
*A47F 1/12* (2006.01)
*A47F 5/00* (2006.01)

(52) U.S. Cl.
CPC ............. *A47F 1/12* (2013.01); *A47F 1/125* (2013.01); *A47F 5/0087* (2013.01)

(58) Field of Classification Search
CPC .. A47F 1/12; A47F 1/121; A47F 1/123; A47F 1/125; A47F 1/126; A47F 1/128; A47F 5/0087
USPC ........................................................ 211/151
See application file for complete search history.

(56) References Cited

U.S. PATENT DOCUMENTS

| | | | | |
|---|---|---|---|---|
| 2,593,089 A | * | 4/1952 | Dodge | B65G 13/11 |
| | | | | 193/35 R |
| 5,788,090 A | * | 8/1998 | Kajiwara | A47F 1/12 |
| | | | | 211/151 |
| 6,089,385 A | * | 7/2000 | Nozawa | A47F 7/28 |
| | | | | 193/35 R |
| 6,409,026 B2 | * | 6/2002 | Watanabe | A47F 1/12 |
| | | | | 312/71 |
| 6,497,326 B1 | * | 12/2002 | Osawa | A47F 1/12 |
| | | | | 414/276 |

(Continued)

FOREIGN PATENT DOCUMENTS

| | | | | |
|---|---|---|---|---|
| DE | 102011051857 B3 | * | 10/2012 | ............. B65G 1/023 |
| EP | 2944228 A1 | * | 11/2015 | ............. A47F 5/005 |

(Continued)

*Primary Examiner* — Stanton L Krycinski
(74) *Attorney, Agent, or Firm* — Richard A. Fagin

(57) ABSTRACT

A roller track for a merchandiser has a roller frame with longitudinally spaced pedestals having a top surface and extending vertically from the roller frame on each lateral side to form receptacles. A roller is disposed in at least a portion of the receptacles. A plurality of longitudinally spaced apart, laterally extending first protrusions is disposed on each lateral edge of the roller frame. Spaces between first protrusions define first openings. A bottom of the first protrusions is elevated from a bottom of the roller frame. A plurality of longitudinally spaced apart second protrusions extends laterally from each lateral edge of the roller frame. Spaces between the second protrusions define second openings. The first protrusions and the second protrusions are longitudinally and vertically offset from each other. A longitudinally extending rail is affixed to the pedestal top surfaces on each side of the roller frame.

19 Claims, 11 Drawing Sheets

(56) References Cited

U.S. PATENT DOCUMENTS

| | | | | |
|---|---|---|---|---|
| RE38,517 E | * | 5/2004 | Pfeiffer | B65G 1/023 |
| | | | | 211/151 |
| 7,114,606 B2 | * | 10/2006 | Shaw | B65G 1/023 |
| | | | | 193/35 J |
| 7,124,897 B2 | * | 10/2006 | Bustos | B65D 19/44 |
| | | | | 211/59.3 |
| 7,497,342 B2 | * | 3/2009 | Hardy | A47F 1/126 |
| | | | | 211/151 |
| 7,628,282 B2 | * | 12/2009 | Hardy | A47F 1/126 |
| | | | | 211/151 |
| 8,025,162 B2 | * | 9/2011 | Hardy | A47F 1/126 |
| | | | | 211/151 |
| 8,276,772 B2 | * | 10/2012 | Kim | A47F 1/12 |
| | | | | 211/151 |
| 8,376,154 B2 | * | 2/2013 | Sun | A47F 1/125 |
| | | | | 193/35 J |
| 8,573,379 B2 | * | 11/2013 | Brugmann | A47F 1/125 |
| | | | | 211/144 |
| 8,596,443 B2 | * | 12/2013 | Brugmann | A47F 5/0093 |
| | | | | 211/172 |
| 8,662,325 B2 | * | 3/2014 | Davis | A47F 5/005 |
| | | | | 211/151 |
| 9,016,482 B2 | * | 4/2015 | Kim | A47F 1/126 |
| | | | | 211/59.2 |
| 9,016,483 B2 | * | 4/2015 | Howley | A47F 1/126 |
| | | | | 211/59.3 |
| 9,038,804 B1 | * | 5/2015 | Nickell | B65G 13/11 |
| | | | | 211/151 |
| 9,173,504 B2 | * | 11/2015 | Hardy | A47B 57/585 |
| 9,220,353 B2 | | 12/2015 | Bruegmann | |
| 9,266,678 B2 | * | 2/2016 | Nickell | B65G 13/11 |
| 9,375,098 B2 | * | 6/2016 | Sun | A47F 1/125 |
| 9,549,622 B2 | * | 1/2017 | Leahy | A47F 5/005 |
| 9,994,395 B2 | * | 6/2018 | Tong | B65G 21/06 |
| 10,064,500 B2 | * | 9/2018 | Furui | A47F 1/12 |
| 10,159,359 B2 | * | 12/2018 | Borg | B65G 1/023 |
| 10,251,493 B2 | * | 4/2019 | Kim | B65G 1/023 |
| 10,441,094 B2 | * | 10/2019 | Kim | B65G 1/026 |
| 10,617,206 B2 | | 4/2020 | Bruegmann | |
| 11,040,830 B1 | * | 6/2021 | Tong | B65G 13/11 |
| 11,064,816 B2 | * | 7/2021 | Sun | A47B 57/406 |
| 11,222,306 B2 | * | 1/2022 | Sun | G06Q 10/087 |
| 11,229,302 B2 | * | 1/2022 | Ciesick | A47F 1/126 |
| 11,254,505 B2 | * | 2/2022 | Sun | B65G 39/02 |
| 11,259,652 B2 | * | 3/2022 | Hardy | A47F 1/12 |
| 12,291,402 B2 | * | 5/2025 | Mook | B65G 39/12 |
| 2004/0178156 A1 | * | 9/2004 | Knorring, Jr. | A47F 1/12 |
| | | | | 211/151 |
| 2010/0133214 A1 | * | 6/2010 | Evans | A47F 1/12 |
| | | | | 211/49.1 |
| 2010/0206829 A1 | * | 8/2010 | Clements | A47F 1/12 |
| | | | | 211/184 |
| 2011/0186401 A1 | | 8/2011 | Bruegmann | |
| 2011/0204012 A1 | * | 8/2011 | Eguchi | A47F 11/10 |
| | | | | 211/85.8 |
| 2012/0217212 A1 | * | 8/2012 | Czalkiewicz | A47F 1/12 |
| | | | | 211/59.2 |
| 2013/0015155 A1 | | 1/2013 | Bruegmann | |
| 2013/0213916 A1 | * | 8/2013 | Leahy | A47F 1/04 |
| | | | | 428/167 |
| 2015/0374129 A1 | * | 12/2015 | Sozio | B65G 39/02 |
| | | | | 211/151 |
| 2018/0042401 A1 | * | 2/2018 | Sun | A47F 5/005 |
| 2020/0397663 A1 | * | 12/2020 | Lu | G07F 11/28 |
| 2022/0039563 A1 | * | 2/2022 | Peters | A47F 5/005 |
| 2022/0160124 A1 | * | 5/2022 | Hollis | A47F 1/12 |
| 2022/0369831 A1 | * | 11/2022 | Bruegmann | A47F 5/0068 |

FOREIGN PATENT DOCUMENTS

| | | | | |
|---|---|---|---|---|
| FR | 2942590 A1 | * | 9/2010 | A47F 1/126 |
| WO | WO-9930597 A1 | * | 6/1999 | A47F 1/12 |
| WO | WO-2010108829 A1 | * | 9/2010 | B65G 1/023 |
| WO | WO-2015154067 A1 | * | 10/2015 | A47B 57/585 |
| WO | WO-2020242399 A1 | * | 12/2020 | A47F 5/0043 |

* cited by examiner

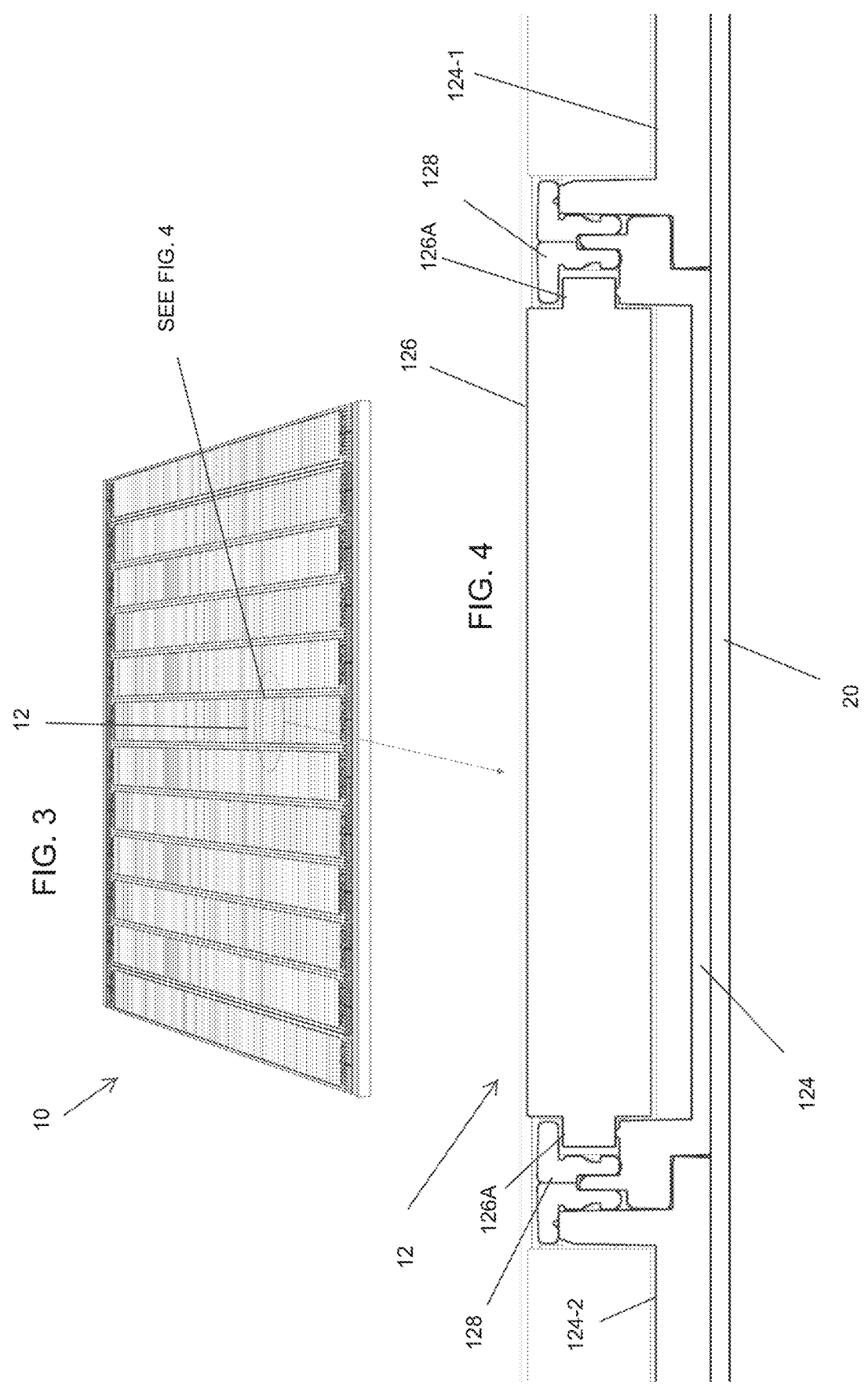

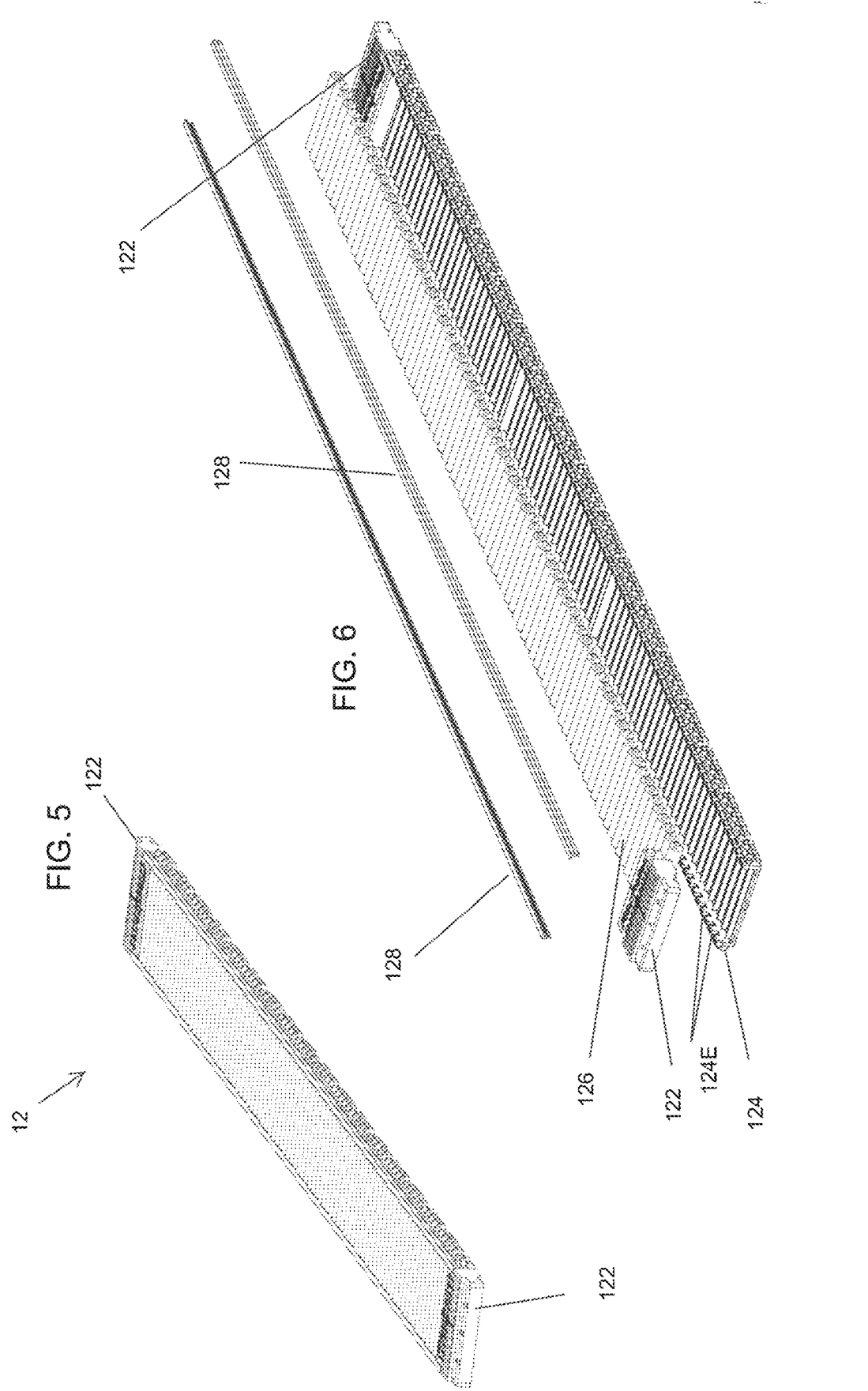

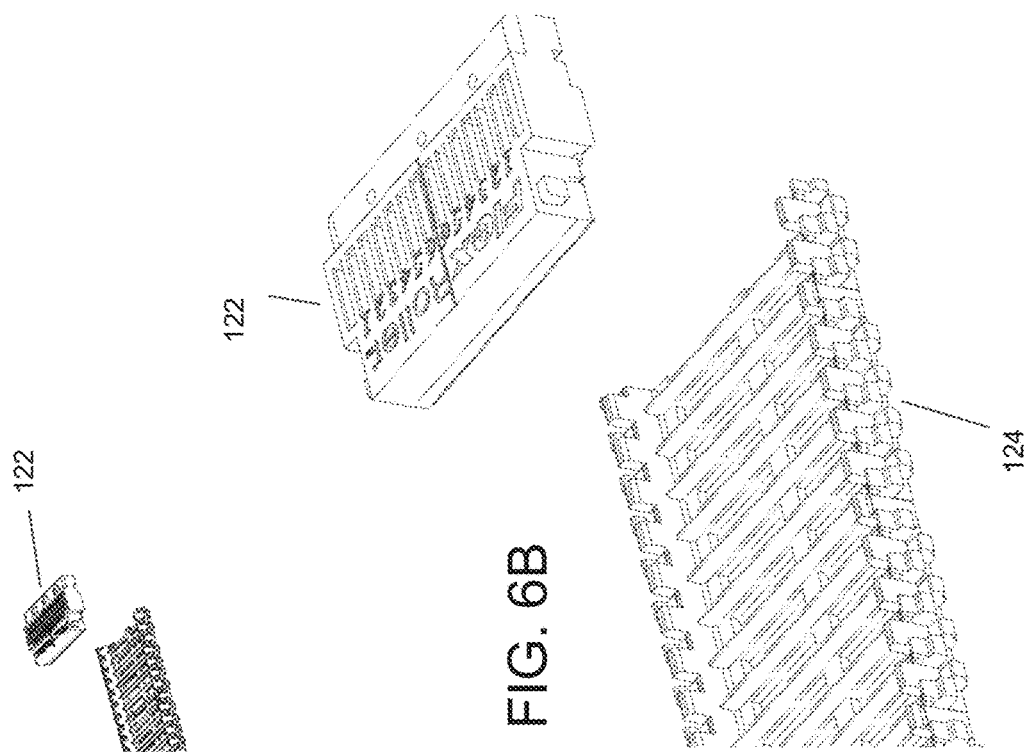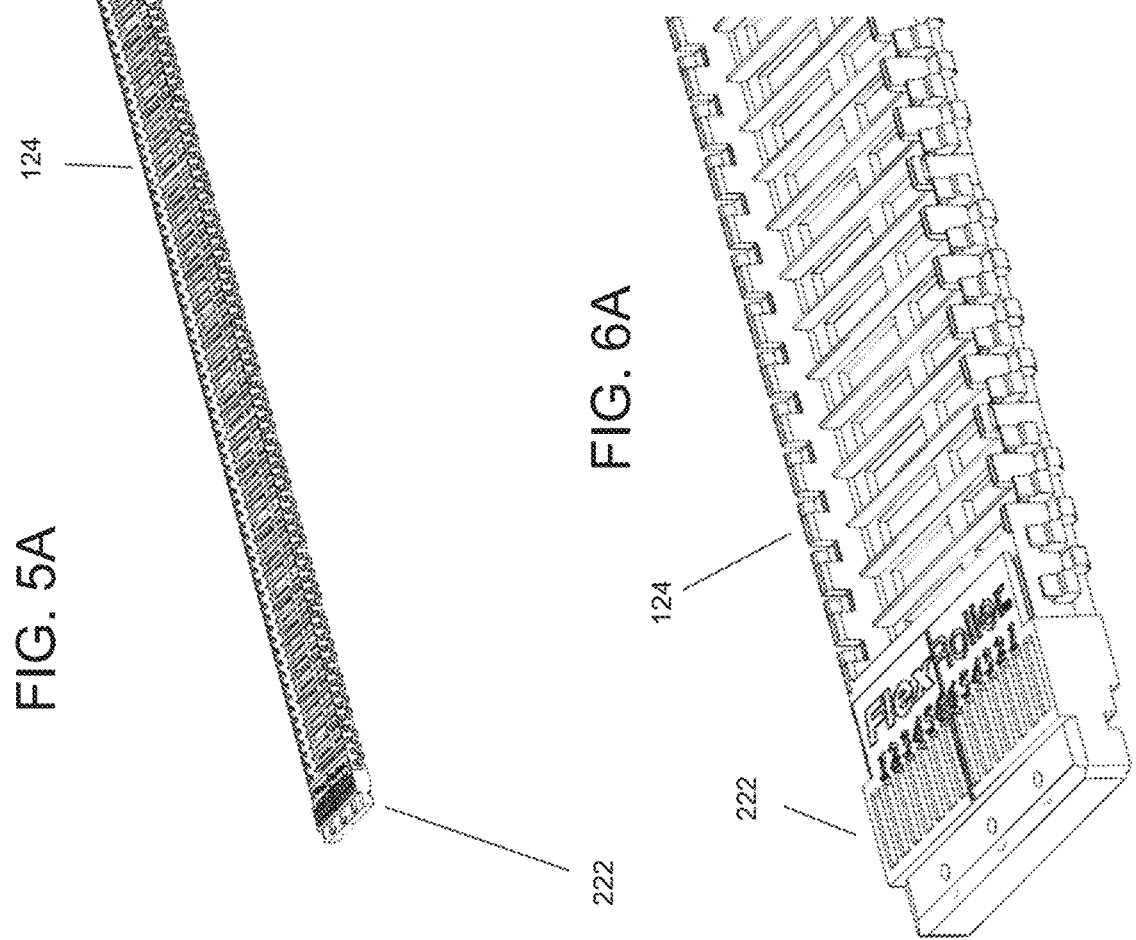

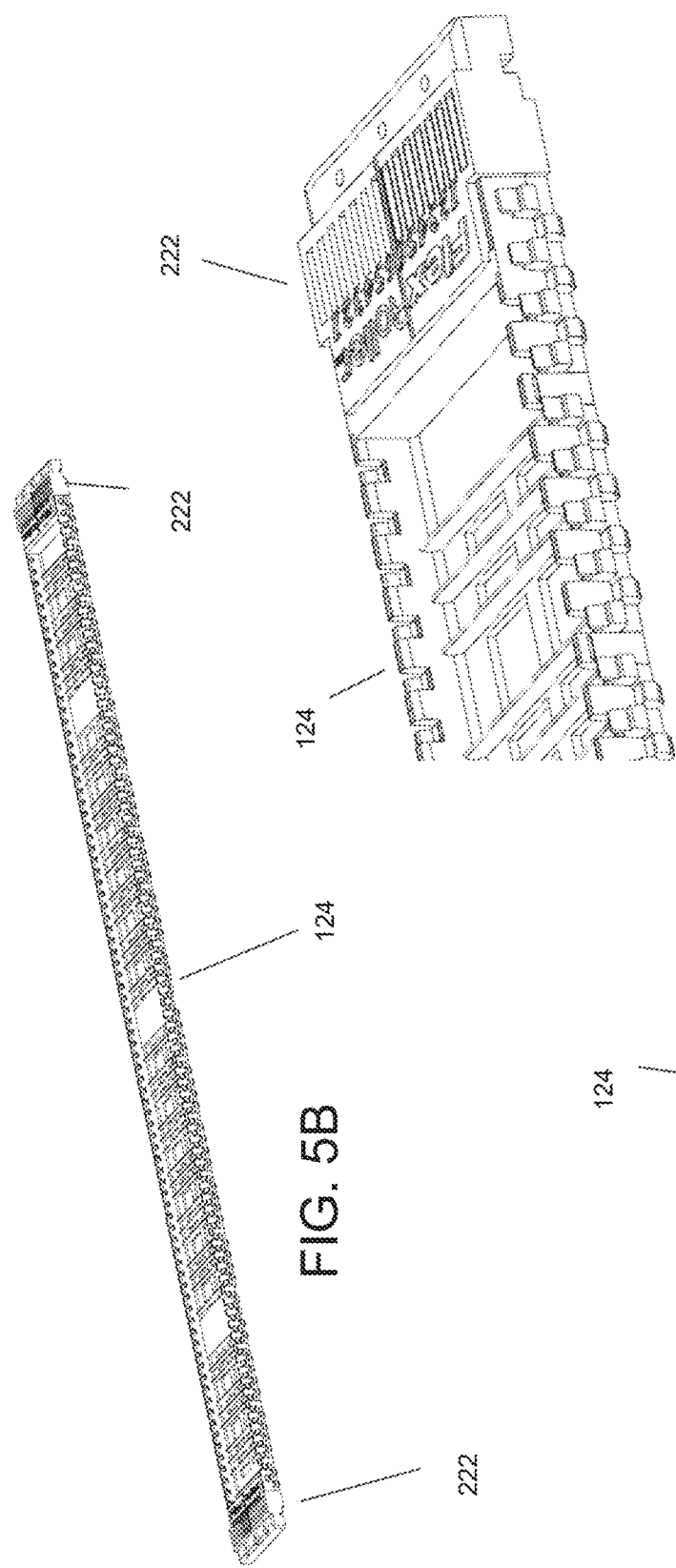
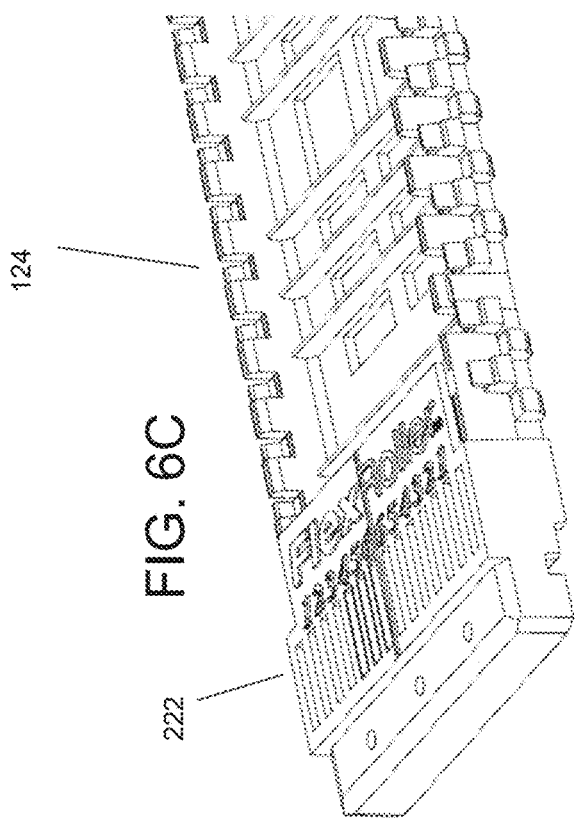
FIG. 5B
FIG. 6C
FIG. 6D

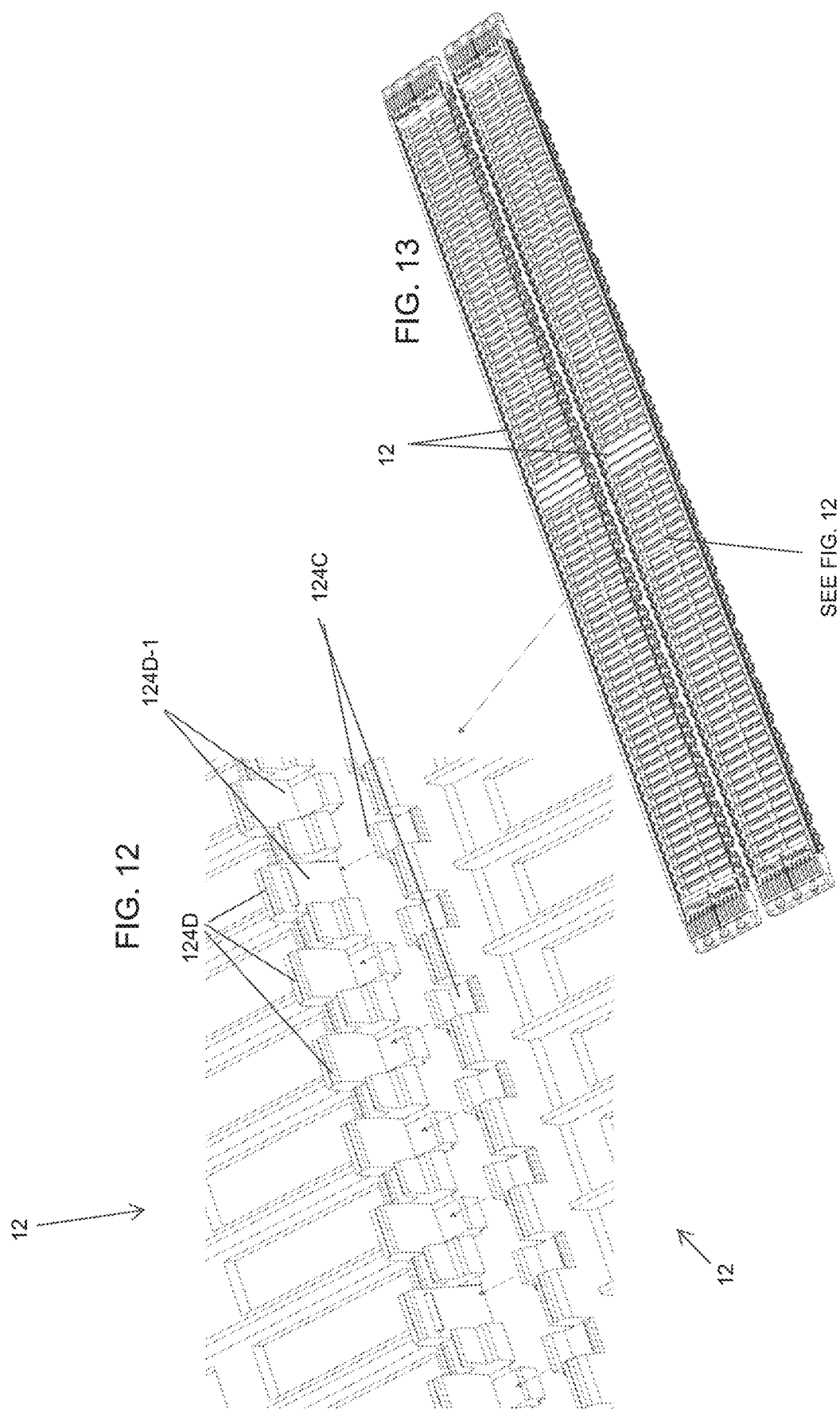

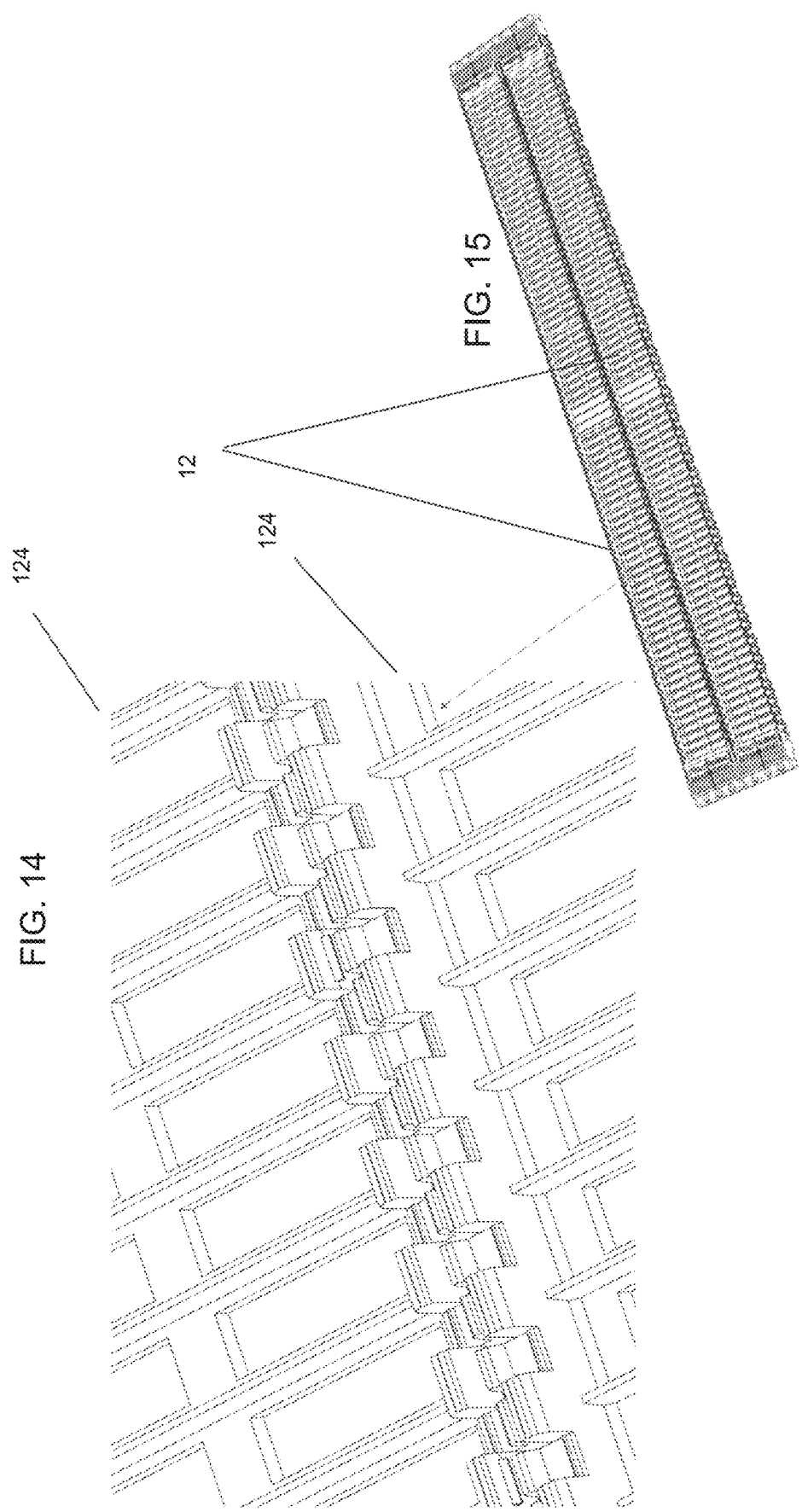

MERCHANDISE DISPLAY ROLLER TRACK HAVING HIGH STRUCTURAL RIGIDITY

CROSS REFERENCE TO RELATED APPLICATIONS

Priority is claimed from U.S. Provisional Application No. 63/428,514 filed on Nov. 29, 2022. The foregoing application is incorporated herein by reference in its entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of retail merchandise displays. More specifically, the disclosure relates to roller tracks for use in such displays to reduce friction wherein the display provides some form of "fronting", i.e., a mechanism to urge product packages stored in rows or "lanes" on the display toward the front of the display.

Retail product merchandise displays include various forms of "fronting" mechanisms, that is, a device for urging product packages or containers disposed on a display base toward the front of the display for shopper access. Forms of fronting include gravity, which is provided by tilting the display base toward the front of the display, and spring-loaded pushers to provide such urging force. Various devices known in the art for reducing friction between product packages or containers and the display base or floor include roller tracks. In general, roller tracks comprise a roller frame having a plurality of roller receptacles along the length of the roller frame. A plurality or cylindrical rollers is disposed in the roller receptacles. The roller frame and the rollers are typically made from injection molded plastic. Various devices may be provided to hold the rollers in the roller receptacles, including, for example, metal rails that attach to each side of the roller frame. Metal rails may provide the advantage of adding structural rigidity to the assembled roller track. Other versions of roller track having all-plastic construction are known in the art and one such type of roller track is sold under the trademark FLEXROLLER, which is a registered trademark of Bruegmann USA, Inc., Houston, Texas. One implementation of such roller tracks sold under the FLEXROLLER trademark is described in U.S. Pat. No. 9,220,353 issued to Bruegmann. The roller track disclosed wherein rollers are retaining in the roller receptacles by a generally C-shaped rail that attaches to each side of the roller frame. The generally C-shaped rails have features that limit movement of one rail with respect to an adjacent rail when the two are in contact with each other. The limitation on movement is along a line perpendicular to the plane of the roller tracks; relative longitudinal movement between two adjacent tracks is not correspondingly limited.

Having such side rails to hold the rollers in the roller receptacles leaves room for improvement in the structural rigidity of a display base made form a plurality of adjacent roller tracks. Such side rails also make fully automated assembly of the roller tracks more difficult. There is a need for a roller track having improved structural rigidity when assembled in a display base. There is also a need for roller tracks that can be readily assembled using automated processes, in particular wherein all the assembled components are moved perpendicularly with respect to a plane of the roller frame.

SUMMARY

One aspect of the present disclosure is a roller track for a merchandise display. A roller track according to this aspect of the disclosure has a roller frame with longitudinally spaced apart pedestals extending perpendicularly from a plane of the roller frame on each lateral side thereof. Spaces between the pedestals form receptacles for rollers. The pedestals have a top surface. A roller is disposed in each of at least a portion of the receptacles. A plurality of longitudinally spaced apart, laterally extending first protrusions is disposed on each lateral edge of the roller frame. Spaces between first protrusions define first openings. A bottom of the first protrusions is elevated from a bottom of the roller frame. A plurality of longitudinally spaced apart second protrusions extends laterally from each lateral edge of the roller frame. Spaces between the second protrusions define second openings. The first protrusions and the second protrusions are longitudinally and vertically offset from each other. A longitudinally extending rail is affixed to the pedestal top surfaces on each side of the roller frame, wherein the rollers are locked into the at least a portion of the receptacles.

A display base according to another aspect of the present disclosure includes a plurality of roller tracks disposed side by side. Each of the roller tracks is coupled at one longitudinal end to a first transverse rail, and at another longitudinal end to a second transverse rail. Each of the plurality of roller tracks includes a roller frame with longitudinally spaced apart pedestals extending perpendicularly from a plane of the roller frame on each lateral side thereof. Spaces between the pedestals form receptacles for rollers. The pedestals have a top surface. A roller is disposed in each of at least a portion of the receptacles. A plurality of longitudinally spaced apart, laterally extending first protrusions is disposed on each lateral edge of the roller frame. Spaces between first protrusions define first openings. A bottom of the first protrusions is elevated from a bottom of the roller frame. A plurality of longitudinally spaced apart second protrusions extends laterally from each lateral edge of the roller frame. Spaces between the second protrusions define second openings. The first protrusions and the second protrusions are longitudinally and vertically offset from each other. A longitudinally extending rail is affixed to the pedestal top surfaces on each side of the roller frame, wherein the rollers are locked into the at least a portion of the receptacles.

In some embodiments, each longitudinally extending rail is fusion welded to the top surfaces of each of the pedestals.

In some embodiments, each longitudinally extending rail comprises an L-shaped cross-section, and wherein the first protrusions define a support surface for one edge of the L-shaped cross-section of each rail.

In some embodiments, the one edge of the L-shaped cross-section is fusion welded to the support surface defined by each of the first protrusions.

In some embodiments, the first protrusions on one lateral edge of the roller frame are longitudinally offset from the first protrusions on another lateral edge.

In some embodiments, the longitudinal offset comprises one half of a distance between the first protrusions.

Some embodiments further comprise an end cap disposed at at least one longitudinal end of the roller frame, the end cap comprising laterally extending features to engage one of the receptacles on each lateral side of the roller frame.

In some embodiments, the first protrusions define, with respect to the plane of the roller frame, a horizontal surface and a vertical surface, the vertical surface defining a space between a respective one of the pedestals and the vertical surface.

In some embodiments, each longitudinally extending rail comprises an L-shaped cross-section, and one edge of the L-shaped cross section is disposed within the space defined between the vertical surfaces and the pedestals.

Other aspects and possible advantages will be apparent from the description and claims that follow.

BRIEF DESCRIPTION OF THE DRAWINGS

FIG. 3 shows the display base of FIG. 1 to illustrate one specific roller track to be explained with reference to FIG. 4.

FIG. 4 shows a cross-sectional view of one of the roller tracks according to the present disclosure and as indicated specifically in FIG. 3.

FIG. 5 shows an oblique view of an example embodiment of a roller track according to the present disclosure.

FIG. 5A shows an oblique view of another example embodiment of a roller track having one permanently affixed end cap and one removable end cap prior to insertion of the rollers.

FIG. 5B shows an oblique view of another example embodiment of a roller track having permanently affixed end caps at each end.

FIG. 6 shows an exploded view of the roller track of FIG. 5.

FIGS. 6A and 6B show enlarged views, respectively of the one end and the other end of the roller track shown in FIG. 5A.

FIGS. 6C and 6D show enlarged views, respectively of each end of the embodiment shown in FIG. 5B.

FIG. 12 shows an expanded partial view of two roller frames according to the present disclosure adjacent to each other as they would be assembled in a display base.

FIG. 13 shows the two roller frames of FIG. 12 in a complete, oblique view.

FIGS. 14 and 15 show, respectively, the two roller frames of FIGS. 12 and 13 connected to each other laterally as they would be disposed when assembled into a display base.

DETAILED DESCRIPTION

Figure 1:
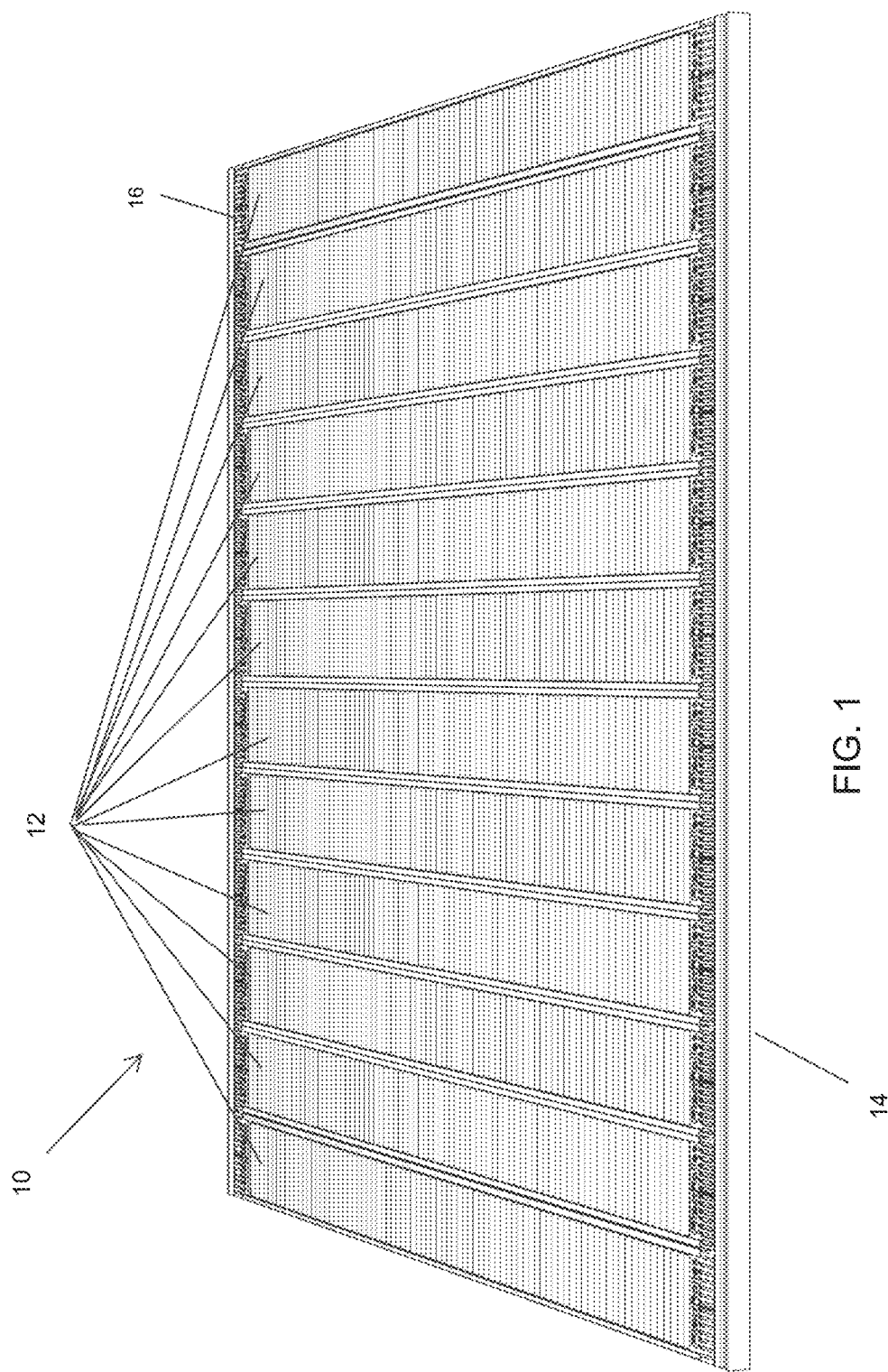
FIG. 1 shows an example embodiment of a retail merchandise display base having a plurality of roller tracks according to the present disclosure.

FIG. 1 shows an example embodiment of a retail merchandise display base 10 including a plurality of roller tracks 12 according to the present disclosure. The display base 10 may include a plurality of the disclosed roller tracks 12 assembled to each other side by side, i.e., laterally. The roller tracks 12 may be coupled at one longitudinal end to a first rail 14, e.g., a front rail, and at the other longitudinal end to a second rail 16, e.g., a back rail. "Front" and "back" as used herein only refer to positioning within a merchandise display with respect to position of shoppers as they would approach the merchandise display. The front 14 and back rail 16 may be referred to elsewhere herein as transverse rails to distinguish them from other devices referred to as rails (explained further below). Features disposed on the lateral edges of each roller track 12 will be set forth in more detail below.

Figure 2:
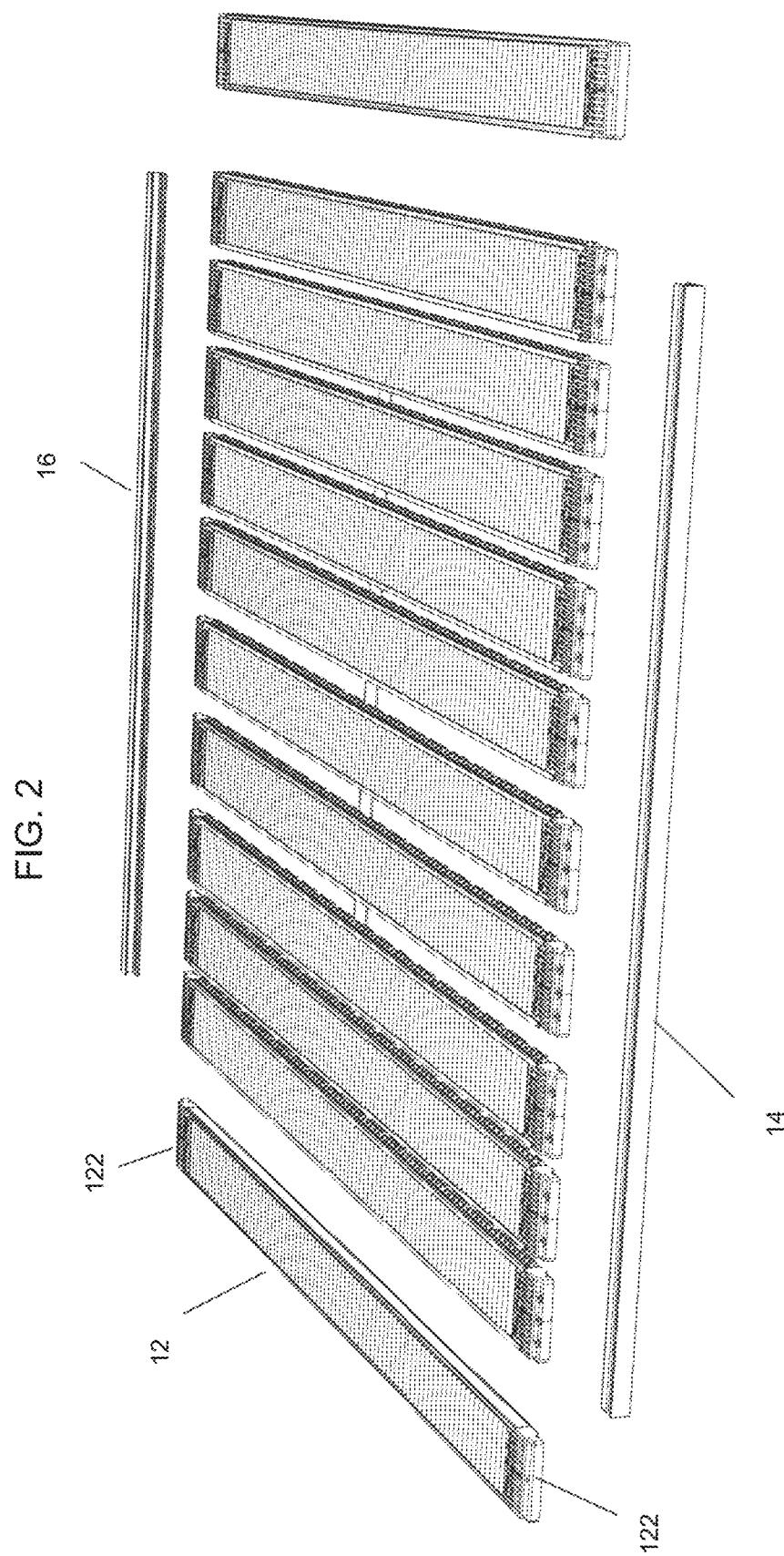
FIG. 2 shows an exploded view of the display base of FIG. 1.

FIG. 2 shows an exploded view of the display base 10 shown previously in FIG. 1, wherein each roller track 12 may comprise an end cap 122 at one or both longitudinal ends to facilitate coupling the roller track 12 to either or both of the transverse rails 14, 16. Embodiments of the end caps 122 having specific features to assemble them to the roller tracks 12 will be explained in more detail below with reference to FIG. 7 and FIG. 8.

Each of the roller tracks 12, as will be explained in more detail below, comprises a roller frame (124 in FIG. 4) having a plurality of roller receptacles (explained further below) along its length, a plurality of rollers (126 in FIG. 4) each of which is disposed in a corresponding one of the roller receptacles, and a longitudinally extending, roller retaining rail or cap on each lateral side of the roller frame to lock the rollers in place. Some embodiments of the retaining rail or cap (hereinafter "rail" for convenience) may enhance structural rigidity of the assembled roller track 12.

FIG. 3 shows another view of the display base 10 to particularly point out a location within one of the roller tracks 12 and an adjacent roller track 12 disposed adjacent thereto on each side of the one of the roller tracks 12 that is shown in cross-section in FIG. 4. All the foregoing components may be made from plastic, such as by injection molding.

The cross section in FIG. 4 shows one of the rollers 126, which may be substantially cylindrically shaped and may have a spindle 126A on each longitudinal end. Each spindle 126A rests in a corresponding roller receptacle in the roller frame, which roller frame is shown at 124. Roller frames of the adjacent roller tracks are shown at 124-1 and 124-2, respectively in FIG. 4. A roller retaining rail 128 may be disposed proximate each lateral edge of the roller frame 124. The roller retaining rails 128 may be elongated to traverse most the length of the roller frame 124. In some embodiments the roller retaining rails 128 may have a substantially L-shaped cross-section. The L-shaped cross section may provide an additional degree of structural rigidity to the roller retaining rails 128 once they are affixed to the roller frame 124. The roller retaining rails 128 may be permanently affixed to the roller frame 124 onto certain features, to be explained further below with reference to FIGS. 10 and 12, for example and without limitation, by fusion welding. Fusion welding may be performed, for example and without limitation, by direct heating or by ultrasonic heating. As may be observed in FIG. 4, when the roller retaining rails 128 are affixed to the roller frame 124, the spindles 126A are fully enclosed such that the rollers 126 are retained within the roller frame 124 notwithstanding inverting the roller frame 124 or some amount of bending of the roller frame 124 as may take place during assembly of a display base (see 10 in FIG. 3). In some embodiments of a display base, one or more braces 20 may traverse the bottom of the display base (10 in FIG. 3) to provide structural support to the one or more roller tracks 12 disposed thereon.

FIGS. 5 and 6 show, respectively, an assembled roller track 12 according to the present disclosure and an exploded view of the same roller track 12 to illustrate individual components of the roller track 12. The roller frame 124 may comprise a plurality of longitudinally spaced apart roller receptacles 124E disposed on each side of the roller frame 124, along the length of the roller frame 124. Each of the roller receptacles 124E may receive a spindle (126A in FIG. 4) of a corresponding roller 126 as explained previously. An end cap 122 may be affixed to one or both longitudinal ends of the roller frame 124. One of the roller retaining rails 128 may be disposed over the roller receptacles 124E on each lateral side of the roller frame 124 after insertion of the rollers 126 to enclose the spindles (126A in FIG. 4).

FIG. 5A shows an oblique view of another example embodiment, wherein the roller frame 124 has an end cap 122 at one longitudinal end that may be assembled to the roller frame 124 as will be further explained below with reference to FIGS. 7 and 8. The other longitudinal end of the roller frame 124 may have connected thereto a permanently affixed end cap 222. Such permanently affixed end cap 222 may omit certain mounting features on its sides as will explained further with reference to FIG. 7. The permanently affixed end cap 222 may be affixed to the roller frame 124 by any means known, including, without limitation, interference fit, thermal welding, solvent welding or adhesive bonding. The permanently affixed end cap 222 in some embodiments may be formed integrally with the roller frame 124, rather than made separately and affixed afterward. Enlarged views of the respective longitudinal ends show the permanently affixed end cap 222 in FIG. 6A and show the other version of the end cap 122 in FIG. 6B.

Figure 9:
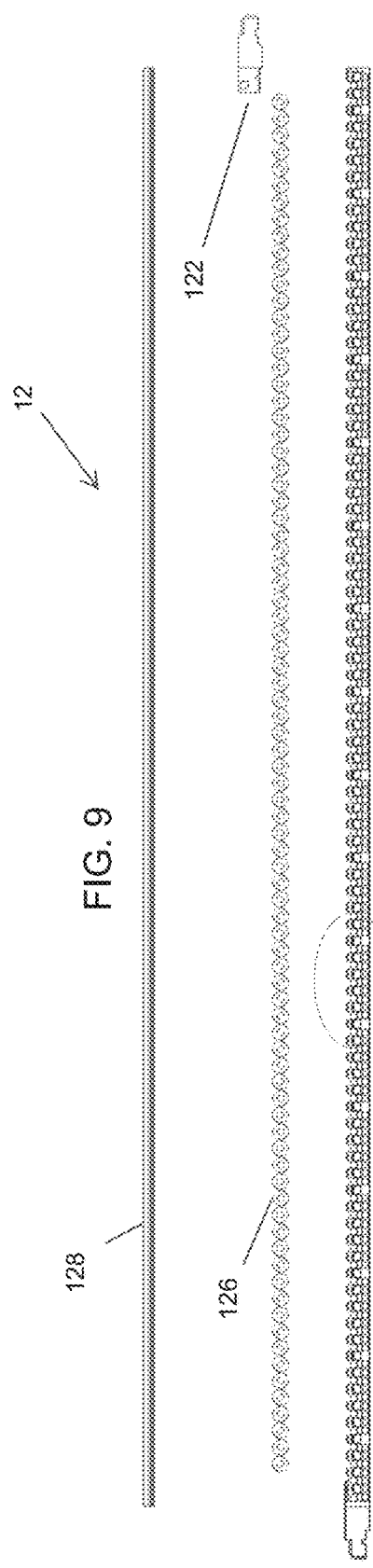
FIG. 9 shows an exploded side view of a roller track according to the present disclosure.

In some embodiments, and referring to FIG. 5B, a permanently affixed end cap 222 may be attached to each longitudinal end of the roller frame 124, at any time, either prior to or after insertion of the rollers (see 126 in FIG. 9). The permanently affixed end caps 222 may be similar in structure to those explained above with reference to FIGS. 5A and 6A. Expanded views of each longitudinal end of the roller frame 124 of FIG. 5B are shown, respectively, in FIGS. 6C and 6D. In some embodiments, as explained with reference to FIG. 5A, both permanently affixed end caps 222 may be permanently attached such as by solvent or thermal welding, interference fit or integrally formed with the roller frame 124, such as by injection molding.

Figure 8:
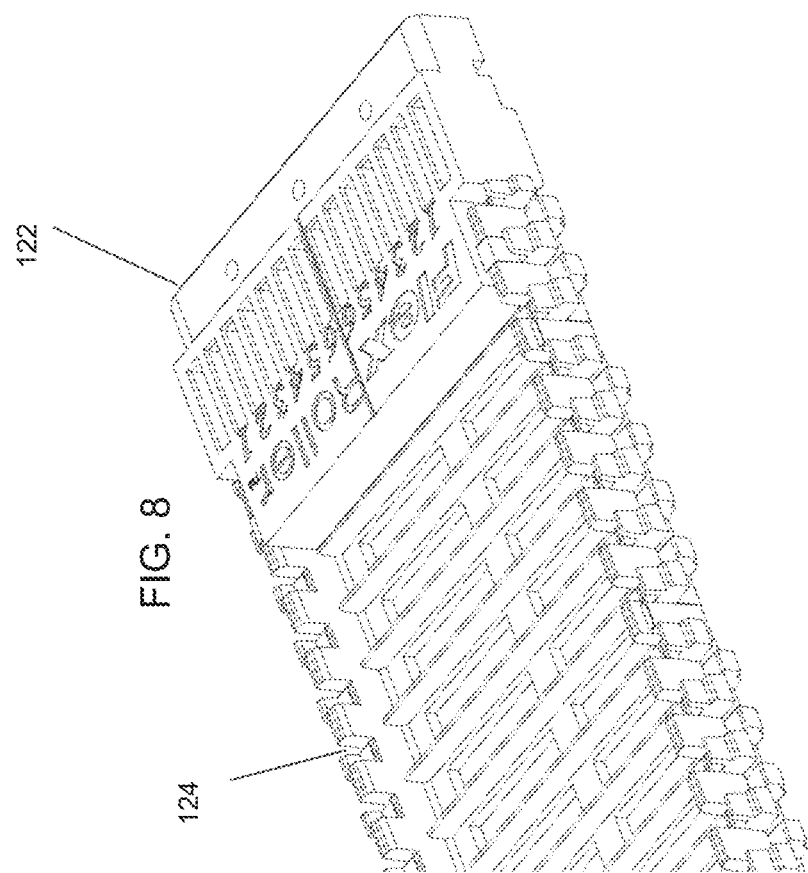
FIG. 8 shows the end cap and roller frame of FIG. 6 assembled to each other.
Figure 7:
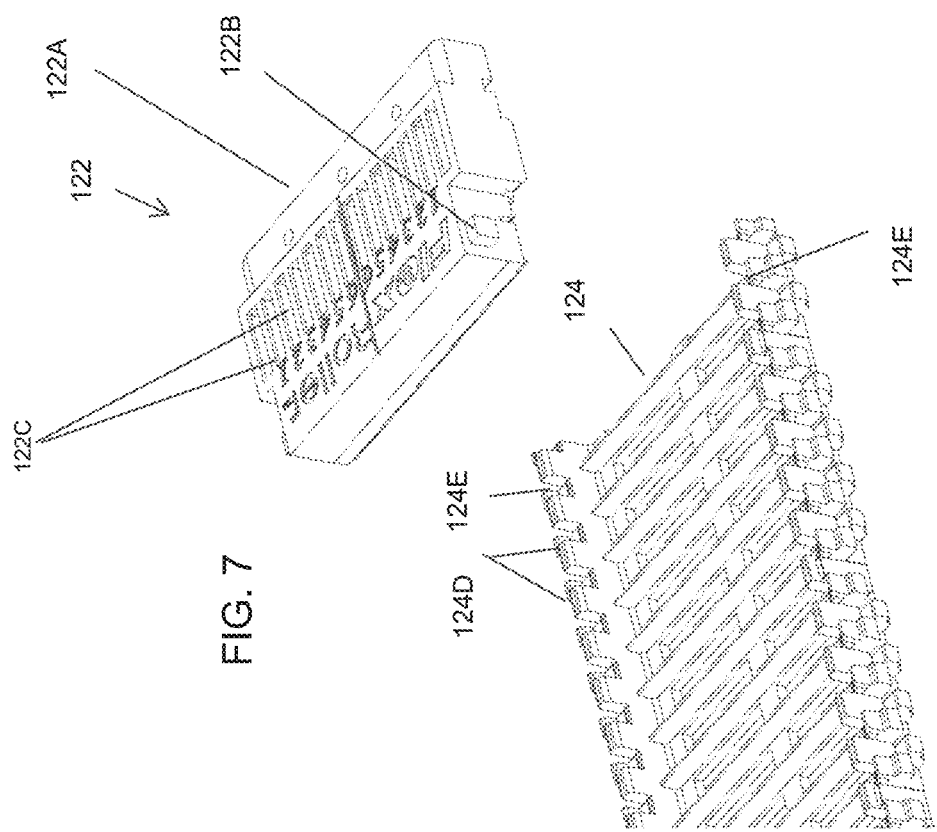
FIG. 7 shows an expanded, disassembled view or one longitudinal end of a roller frame and an end cap of a roller track according to the present disclosure.

FIGS. 7 and 8 show, respectively, an expanded exploded view and an expanded assembled view of one longitudinal end of one of the roller frames 124 to illustrate an embodiment of attachment of an end cap 122 to the roller frame 124. The roller receptacles 124E may be formed by shaping the sides of the roller frame 124 as a plurality of longitudinally spaced apart posts, pins or pedestals 124D (hereinafter "pedestals" for clarity) extending vertically, meaning in the present context perpendicularly away from a plane defined by the base of the roller frame 124. Spaces between adjacent pedestals 124D form openings that serve as the roller receptacles 124E. The end cap 122 may comprise a feature 122A such as a tongue or groove (depending on the shape of the respective first or second rail) to engage with and lock to one of the first or second rails (e.g., 14 or 16 in FIG. 2), and a protrusion 122B on each side to engage a corresponding one of the roller receptacles 124E. The one or more end caps 122 may be similar to those used in the FLEXROLLER brand roller track set forth in the Background section herein to include features such as slots or holes 122C for placement of lane dividers (not shown) as may be used in some merchandise displays.

FIG. 9 shows an exploded side view of one of the roller tracks 12 to illustrate an example embodiment of assembly of such roller track 12, wherein the rollers 126 and an end cap 122 may be moved from above the roller frame 124 to their assembled positions within the roller frame 124, followed by installation of the roller retaining rails 128 onto the roller frame 124. Notably, the components to be assembled to the roller frame 124, comprising the rollers 126 and roller retaining rails 128, and in some embodiments an end cap 122 at one or both longitudinal ends of the roller frame 124, may all be placed onto the roller frame 124 by simple vertical motion (again, in the present context vertical means perpendicular to the plane of the roller frame 124). Such assembly may facilitate automated assembly of the roller tracks 12 by eliminating the need to slide side rails onto the roller frame or to attach components using anything other than vertical motion.

Figure 10:
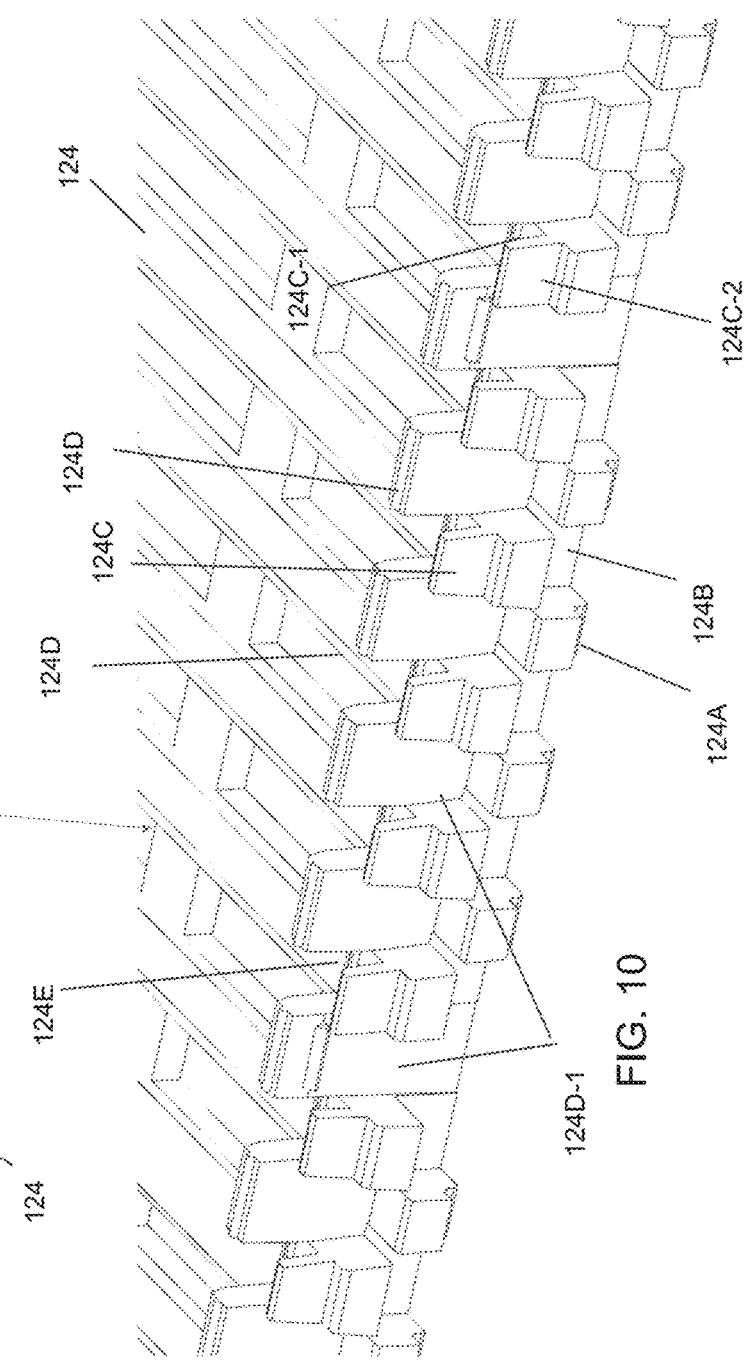
FIG. 10 shows an expanded partial view of a roller frame according to the present disclosure to illustrate specific features of the roller track.

FIG. 10 shows an expanded partial view of the roller frame 124 to better explain certain features disposed on each side of the roller frame 124. As explained with reference to FIGS. 7 and 8, the roller receptacles 124E may be formed by shaping the lateral side of the roller frame 124 as a plurality of longitudinally spaced apart pedestals 124D extending vertically, meaning in the present context, away from the plane of the roller frame 124. "Horizontal" as may be used herein refers to a direction parallel to the plane of the roller frame 124. The roller receptacles 124E are thus formed between adjacent pedestals 124D on each lateral side of the roller frame 124. The pedestals 124D and therefore the roller receptacles 124E may be located at longitudinally corresponding positions along each side of the roller frame 124.

A plurality of spaced apart retaining rail supports 124C may extend horizontally and laterally away from each lateral side of the roller frame 124, which would be in the direction of an adjacent roller track. In some embodiments, each of the retaining rail supports 124C may correspond to the longitudinal position of one of the roller receptacles 124E. It is to be understood that the pitch and spacing of the retaining rail supports 124C need not, however, match the pitch and spacing of the pedestals 124D. Neither is it required to have the longitudinal positions of the retaining rail supports 124C correspond to the longitudinal positions of the roller receptacles 124E. In some embodiments, the longitudinal positions of the retaining rail supports 124C on one side of the roller frame 124 may be displaced longitudinally by one-half the distance (pitch or spacing) between adjacent retaining rail supports 124C on the other side of the roller frame 124. Such longitudinal displacement provides that the roller frame 124 may be assembled to adjacent roller frames (as in FIGS. 1, 2 and 3) such that the juxtaposed roller frames 124 are in longitudinal alignment and without the need to make "handed" or directionally constrained versions of the roller frame 124. It will be appreciated however that the pedestals 124D may have the same pitch, spacing and longitudinal positions on both sides of the roller frame 124 such that the rollers 126 are disposed transversely to the length of the roller frame 124. The manner in which the retaining rail supports 124C on one roller track engage spaces 124D-1 between adjacent pedestals 124D on the adjacent roller track causes the adjacent roller tracks to be in fixed longitudinal relationship with respect to each other.

In some embodiments, the bottom of the retaining rail supports 124C may be elevated from the bottom of the roller frame 124 so as to provide an intermeshing space 124B below each retaining rail support 124C. In such embodiments, a protrusion 124A such as a pin, post or block, may extend horizontally, laterally away from the side of the roller frame 124 between adjacent retaining rail supports 124C. Thus, when two laterally adjacent roller frames 124 are disposed next to each other, the protrusions 124A on one roller frame 124 align with and may be moved into the intermeshing spaces 124B on the adjacent roller frame 124. Correspondingly, the retaining rail supports 124C on one roller frame 124 may engage the receptacles 124D-1 between the retaining rail supports 124C on the adjacent roller frame 124. In this way, the adjacent roller tracks are also maintained in fixed elevation with respect to each other, that is, the planes of the two roller tracks are bound by the intermeshing of the retaining rail supports 124C with the adjacent roller track's spaces 124D-1 and the intermeshing of the protrusions 124A with the intermeshing spaces 124B. Such intermeshing features and how they constrain relative motion between adjacent roller tracks may increase the structural rigidity of the assembled display base (10 in FIG. 1).

In some embodiments, some or each of the retaining rail supports 124C may comprise a horizontal face 124C-1 to support an end surface of one of the roller retaining rails (128 in FIG. 9) and a perpendicular (with reference to the plane of the roller frame) face 124C-2 to hold the roller retaining rail (128 in FIG. 9) in position laterally during assembly. Another surface of each of the roller retaining rails (128 in FIG. 9) may be supported by the tops of the pedestals 124D. If flat rails are used instead of generally L-shaped cross section rails, then the roller retaining rails 128 may simply attach to the tops of the pedestals 124D, again such as by fusion welding (e.g., ultrasonic welding). It will be appreciated that flat roller retaining rails may be used in embodiments in which the vertical face 124C-2 of the retaining rail supports 124C is omitted.

Figure 11:
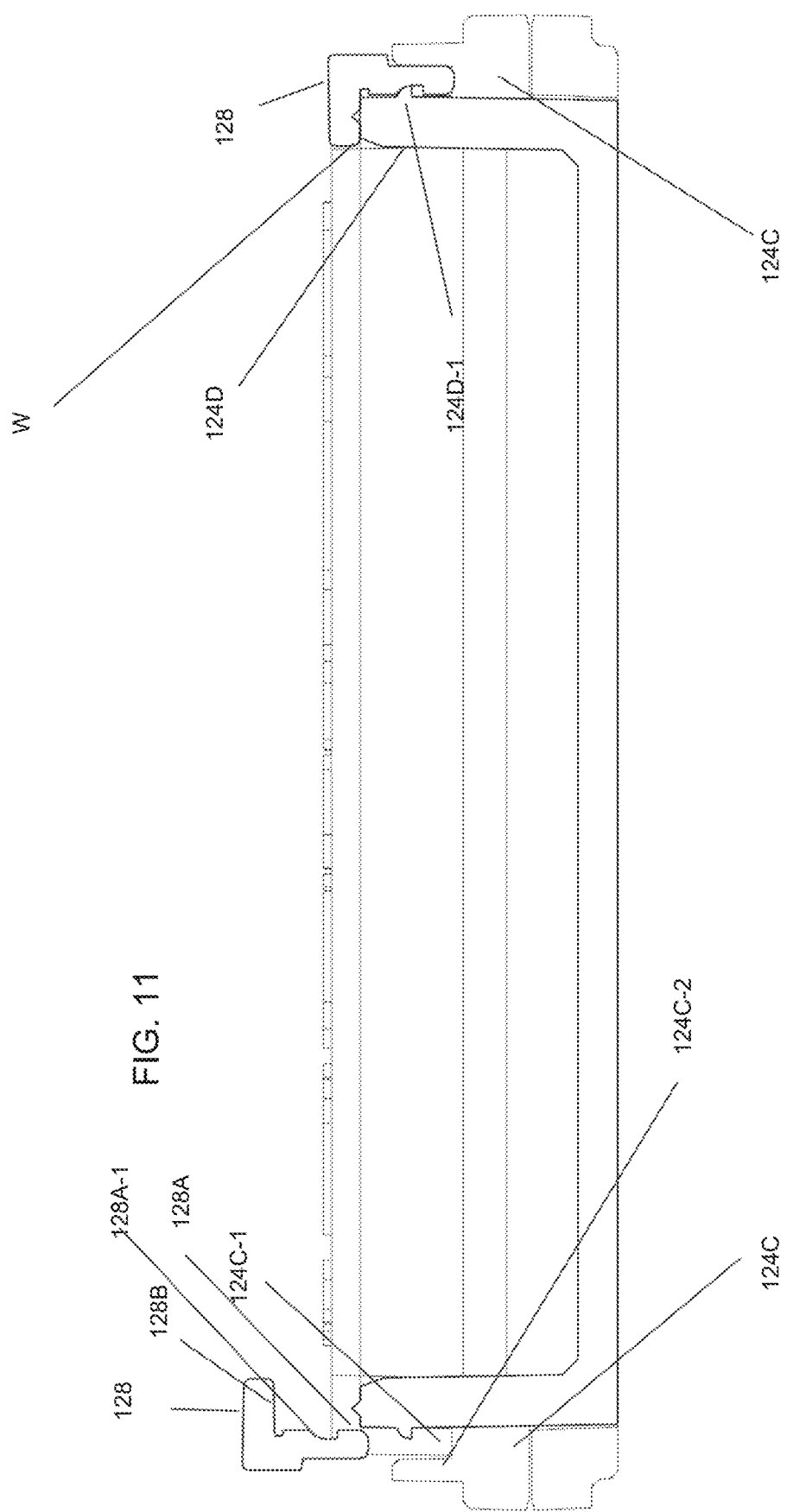
FIG. 11 shows a cross-section of a roller track according to the present disclosure to illustrate specifically roller retaining rails assembled to the roller frame.

FIG. 11 shows a cross-section of the roller frame 124 shown in FIG. 10 to better illustrate attachment and support for one embodiment the retaining rails 128. Each roller retaining rail support 124C may extend laterally away from the roller frame 124 and comprises a vertical wall or surface 124C-2 spaced away from the pedestals 124D so as to define a horizontal surface 124C-1 between the vertical wall 124C-2 and the pedestals 124D. The roller retaining rail 128, as previously explained, may in some embodiments have a substantially L shaped cross section, wherein a vertical edge 128A of the rail 128 may be disposed within the space between the vertical walls 124C-2 and the pedestals 124D. A horizontal edge 128B of the rail 128 may engage the upper surface of the pedestals 124D. The example embodiment shown in FIG. 11 may comprise corresponding locking features, e.g., a notch 128A-1 and tang or protrusion 124D-1, however other embodiments may omit such features. During assembly, once the roller retaining rails 128 are fully inserted, as shown on the right hand side of FIG. 11, the roller retaining rails 128 may be permanently affixed in position such as by thermal welding, for example, ultrasonic welding.

FIG. 12 shows an expanded partial view of two, adjacent roller frames 124 to better understand how the adjacent roller frames 124 intermesh the foregoing described features, i.e., the retaining rail supports 124C and pedestals 124D when two adjacent roller frames 124 are assembled to a display base (e.g., 10 in FIG. 1). FIG. 13 shows a full view of the two, adjacent roller tracks 124 as they are being moved together for assembly. In some embodiments, one or more end caps (122 in FIG. 9) may be attached to the roller frame 124 during assembly. It will be appreciated that assembly of the individual roller tracks 12 may be completed prior to assembly of the roller tracks to any adjacent roller tracks 12. That is, the rollers (126 in FIG. 9) and the roller retaining rails (128 in FIG. 9) are attached to the roller frame 124 before assembly of the resulting roller track 12 to any other device. The views in FIG. 10 and FIG. 12 omit the rollers and retaining rails only for clarity of the illustration.

FIGS. 14 and 15 show views corresponding the what is shown in FIGS. 12 and 13, respectively, after the two roller tracks 12 are joined laterally.

A roller track according to the present disclosure may have sufficient structural rigidity and resistance to dislodgment of the rollers under expected stresses during installation without the need to provide metal side rails or other longitudinal support. In some embodiments, all the components of the roller track may be made from plastic, such as by injection molding. In some embodiments, arrangement of intermeshing features extending laterally from each side of the roller frame may engage mating features on one or more adjacent roller tracks to provide structural rigidity between the adjacent roller tracks and retention of both the longitudinal and vertical positions of two adjacent roller tracks with respect to each other. Further, all the components assembled to the roller frame may be attached by vertical motion of the components into the roller frame, thus facilitating automated assembly In light of the principles and example embodiments described and illustrated herein, it will be recognized that the example embodiments can be modified in arrangement and detail without exceeding the scope of such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

What is claimed is:

1. A roller track for a merchandise display, comprising:
   a roller frame having longitudinally spaced apart pedestals extending vertically with reference to a plane of the roller frame on each lateral side of the roller frame, spaces between the pedestals defining roller receptacles, the pedestals each defining a top surface;
   a roller disposed in each of at least a portion of the receptacles;
   a plurality of longitudinally spaced apart, laterally extending first protrusions disposed on each lateral edge of the roller frame, spaces between the laterally extending first protrusions defining first openings, a bottom of each of the protrusions elevated from a bottom of the roller frame;
   a plurality of longitudinally spaced apart second protrusions extending laterally from each lateral edge of the roller frame, spaces between the laterally extending second protrusions defining second openings, wherein the first protrusions and the second protrusions are longitudinally and vertically offset from each other; and a longitudinally extending rail affixed to the top surfaces of the pedestals on each lateral side of the roller frame.

2. The roller track of claim 1 wherein each rail is fusion welded to the top surface of each of the pedestals.

3. The roller track of claim 1 wherein each rail comprises an L-shaped cross-section, and wherein the first protrusions define a support surface for one edge of the L-shaped cross-section of each rail.

4. The roller track of claim 3 wherein the one edge of the L-shaped cross-section rail is fusion welded to the support surface defined by each of the first protrusions.

5. The roller track of claim 1 wherein the first protrusions on one lateral edge of the roller frame are longitudinally offset from the first protrusions on another lateral edge.

6. The roller track of claim 5 wherein the longitudinal offset comprises one half a distance between adjacent ones of the first protrusions.

7. The roller track of claim 1 further comprising an end cap disposed at at least one longitudinal end of the roller frame, the end cap comprising laterally extending features to engage one of the receptacles on each lateral side of the roller frame.

8. The roller track of claim 1 wherein the first protrusions define, with reference to the plane of the roller frame, a horizontal surface and a vertical surface, the vertical surface defining a space between a respective one of the pedestals and the vertical surface.

9. The roller track of claim 8 wherein each rail comprises an L-shaped cross-section, and one edge of the L-shaped cross section is disposed within the space defiled between the vertical surfaces and the pedestals.

10. A display base for a merchandise display, comprising:
a plurality of roller tracks disposed side by side, each roller track comprising a roller frame having longitudinally spaced apart pedestals extending vertically with reference to a plane of the roller frame on each lateral side of the roller frame, spaces between the pedestals defining roller receptacles, the pedestals each defining a top surface, a roller disposed in each of at least a portion of the receptacles; a plurality of longitudinally spaced apart, laterally extending first protrusions disposed on each lateral edge of the roller frame, spaces between the laterally extending first protrusions defining first openings, a bottom of each of the protrusions elevated from a bottom of the roller frame, a plurality of longitudinally spaced apart second protrusions extending laterally from each lateral edge of the roller frame, spaces between the laterally extending second protrusions defining second openings, wherein the first protrusions and the second protrusions are longitudinally and vertically offset from each other, a longitudinally extending rail affixed to the top surfaces of the pedestals on each lateral side of the roller frame, and an end cap disposed at each longitudinal end of the roller frame, the end cap comprising laterally extending features to engage one of the receptacles on each lateral side of the roller frame; and
wherein the longitudinally spaced apart first protrusions on one of the plurality of roller tracks engage with the spaces between the longitudinally spaced apart first protrusions on at least one adjacent one of the plurality of roller tracks, the longitudinally spaced apart second protrusions on the one of the plurality of roller tracks engaged with the spaces between the longitudinally spaced apart second protrusions on the at least one adjacent roller track.

11. The display base of claim 10 further comprising a first transverse rail engaged with the end cap of one longitudinal end of each of the roller tracks; and
a second transverse rail engaged with the end cap of another longitudinal end of each of the plurality of roller tracks.

12. The display base of claim 10 wherein each longitudinally extending rail of each of the plurality of roller tracks is fusion welded to the top surface of each of the pedestals.

13. The display base of claim 10 wherein each longitudinally extending rail of each of the plurality of roller tracks comprises an L-shaped cross-section, and wherein the first protrusions define a support surface for one edge of the L-shaped cross-section of each longitudinally extending rail.

14. The display base of claim 13 wherein the one edge of the L-shaped cross-section of the longitudinally extending rail is fusion welded to the support surface defined by each of the first protrusions on each of the plurality of roller tracks.

15. The display base of claim 10 wherein the first protrusions on one lateral edge of the roller frame of each of the plurality of roller tracks are longitudinally offset from the first protrusions on another lateral edge.

16. The display base of claim 15 wherein the longitudinal offset comprises one half a distance between adjacent ones of the first protrusions on each of the plurality of roller tracks.

17. The display base of claim 10 wherein the first protrusions on each of the plurality of roller tracks define, with reference to the plane of each roller frame a horizontal surface and a vertical surface, the vertical surface defining a space between a respective one of the pedestals and the vertical surface.

18. The display base of claim 17 wherein each longitudinally extending rail on each of the plurality of roller tracks comprises an L-shaped cross-section, and one edge of the L-shaped cross section is disposed within the space defiled between the vertical surfaces and the pedestals.

19. The roller track of claim 1 further comprising an end cap disposed at each longitudinal end of the roller frame, each end cap being permanently affixed to the roller frame.

\* \* \* \* \*